United States Patent [19]
Kushlefsky et al.

[11] 3,933,692
[45] Jan. 20, 1976

[54] URETHANE FOAM CATALYST

[75] Inventors: Bernard G. Kushlefsky, Edison; Kenneth Treadwell, Rahway, both of N.J.

[73] Assignee: M & T Chemicals Inc., Greenwich, Conn.

[22] Filed: Mar. 14, 1974

[21] Appl. No.: 451,204

[52] U.S. Cl. ........ 260/2.5 AC; 252/426; 252/431 C; 260/2.5 AM; 260/75 NC; 260/75 NM; 260/77.5 AC; 260/77.5 AM
[51] Int. Cl.² .................................. C08G 18/16
[58] Field of Search.. 260/2.5 AC, 77.5 AC, 75 NC, 260/2.5 AM, 72.5 AM, 75 NM

[56] References Cited
UNITED STATES PATENTS

| | | | |
|---|---|---|---|
| 2,765,341 | 10/1956 | Wirth et al. | 260/77.5 AM |
| 3,044,971 | 7/1962 | Polis | 260/2.5 AC |
| 3,645,927 | 2/1972 | Andres et al. | 260/2.5 AC |

Primary Examiner—M. J. Welsh
Attorney, Agent, or Firm—Robert P. Auber; Kenneth G. Wheeless; Robert Spector

[57] ABSTRACT

This invention is a process for making a cellular polyurethane comprising reacting a polyalkylene polyol having reactive hydrogen atoms as determined by the Zerewitinoff method exhibiting a molecular weight of at least 500, an organic polyisocyanate, and water in the presence of a gel catalyst and a foaming catalyst comprising at least one compound selected from those of the formulae:

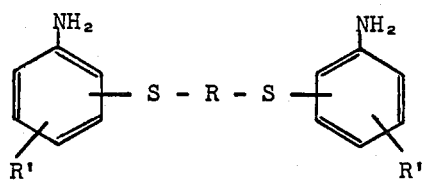

wherein R is a hydrocarbon, and R' is selected from the group consisting of hydrogen, halogens, and hydrocarbons.

13 Claims, No Drawings

URETHANE FOAM CATALYST

This invention relates to polyurethane foams and more specifically to novel blowing catalyst systems and to a method for producing such foams.

It is well known that a polyurethane can be prepared by reacting organic poly-functional isocyanates with organic compounds having two or more reactive hydrogen atoms as determined by the Zerewitinoff reaction. When this reaction is conducted under anhydrous conditions, the resulting polyurethane may be non-porous. If a cellular or foamed product is desired, water and an excess of isocyanate must be added to the mixture. When water reacts with the excess isocyanate groups not previously reacted, cabon dioxide is formed and entrapped in the reaction mixture. Various materials have been employed as catalysts or activators in the formation of polyurethanes. These catalysts have as their prime function the control of gas forming or blowing reaction.

It is an object of this invention to provide an improved and odorless foam product based on polyurethane. It is a further object of this invention to foam polyurethane in an optimum period of time. Other objects will be apparent to those skilled in the art on inspection of the following description.

This invention is a process for making cellular polyurethane comprising reacting a polyalkylene polyol having reactive hydrogen atoms as determined by the Zerewitinoff method, an organic polyisocyanate, and water in the presence of a gel catalyst and a blowing catalyst consisting of at least one compound selected from those of the formulae:

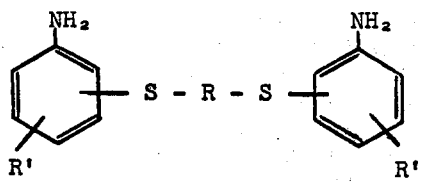

wherein R is a hydrocarbon, and R' is selected from the group consisting of hydrogen, halogens, and hydrocarbons.

The foaming agent of this invention provides an easily controlled foaming process. The novel synergistic catalyst combination of this invention unexpectedly permits extremely rapid foaming reactions in the production of polyurethane. The novel catalyst of this invention produces an optimum rise time.

It will be apparent that the foaming or blowing (or rise) reaction occurs simultaneously with the gelling (or solidification) reaction. When the gelling time of the reaction mixture is properly balanced with the rise time, the solidifying mass entraps the carbon dioxide gas thereby resulting in a foamed product.

DETAILED DESCRIPTION

This invention is a process for making a cellular polyurethane comprising reacting a polyalkylene polyol having reactive hydrogen atoms as determined by the Zerewitinoff method exhibiting a molecular weight of at least 500, an organic polyisocyanate, and water in the presence of a gel catalyst and a foaming catalyst comprising at least one compound selected from those of the formulae:

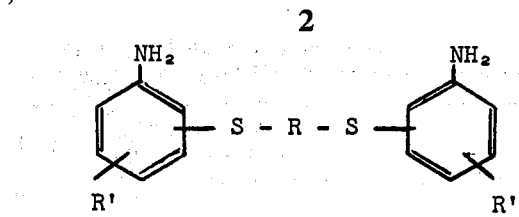

wherein R is a hydrocarbon, and R' is selected from the group consisting of hydrogen, halogens, and hydrocarbons.

In this compound, R may be a hydrocarbon radical preferably selected from the group consisting of alkyl, alkenyl, cycloalkyl, aralkyl, aryl, alkaryl, including such radicals when inertly substituted. When R is alkyl, it may typically be straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl i.e. having less than about 8 carbon atoms i.e. octyls and lower. When R is alkenyl, it may typically be vinyl, allyl, 1-propenyl, methallyl, buten-1-yl, buten-2-yl, buten-3-yl, penten-1-yl, hexenyl, heptenyl, octenyl, decenyl, dodecenyl, tetradecenyl, octadecenyl, etc. When R is cycloalkyl, it may typically be cyclopentyl, cyclohexyl, cycloheptyl, cyclooctyl, etc. When R is aralkyl, it may typically be benzyl, β-phenylethyl, γ-phenylpropyl, β-phenylpropyl, etc. When R is aryl, it may typically be phenyl, naphthyl, etc. When R is alkaryl, it may typically be tolyl, xylyl, p-ethylphenyl, p-nonylphenyl, etc. R may be inertly substituted e.g. may bear a non-reactive substituent such as alkyl, aryl, cycloalkyl, aralkyl, alkaryl, alkenyl, ether, halogen, nitro, ester, etc. Typical substituted alkyls include 3-chloropropyl, 2-ethoxyethyl, carboethoxymethyl, etc. Substituted alkenyls include 4-chlorobutyl, γ-phenylpropenyl, chloroallyl, etc. Substituted cycloalkyls include 4-methylcyclohexyl, 4-chlorocyclohexyl, etc. Inertly substituted aryl includes chlorophenyl, anisyl, biphenyl, etc. Inertly substituted aralkyl includes chlorobenzyl, p-methylbenzyl, etc. Inertly substituted alkaryl includes 3-chloro-5-methylphenyl, 2,6-di-tert-butyl-4-chlorophenyl, etc.

The radical R' may be selected from the group consisting of hydrogen, halogen and hydrocarbon. Preferably, R' is hydrogen. R may be halogen having an atomic weight greater than 19, e.g., chlorine, bromine, and iodine.

When R' is hydrocarbon, it may typically be selected from the same group as R, i.e. it may be selected from the group consisting of alkyl, aryl and alkenyl, including inertly substituted alkyl, aryl and alkenyl. R' may typically be methyl, ethyl, n-propyl, isopropyl, n-butyl, isobutyl, sec-butyl, tert-butyl, amyl, hexyl, octyl, decyl, dodecyl, octadecyl, cyclohexyl, cycloheptyl, vinyl, allyl, 1-propenyl, 1-butenyl, 2-butenyl, 3-butenyl, phenyl, naphthyl, phenanthryl, chlorophenyl, nitrophenyl, benzyl, tolyl, ethylphenyl, phenylethyl, chlorobutyl, 2-ethylhexyl, ethoxyethyl, methylcyclohexyl, 3-chloro-2-butenyl, etc. R and R' may be the same or different and thw two R' radicals may be the same or different. R' may also include divalent hydrocarbons, preferably divalent alkyl (alkandiyl), which may be joined to form a cyclic structure including the nitrogen atom of the dithiocarbamate radical or which may form a bridged structure connecting two dithiocarbamate moieties. For example, R' may be methylene, ethylene, 1,2-propylene, trimethylene, 1,2-butylene, tetramethylene, pentamethylene, hexamethylene, octamethylene, decamethylene, o-phenylene, m-phenylene, p-phenylene, 4,4'-biphenylene, α-tolylene, xylylene, etc.

Preferred foaming or blowing catalysts of this invention are:

Bis(o-aminophenylthio) methane
Bis(o-aminophenylthio) ethane
Bis(o-aminophenylthio)-1,2 propane
Bis(o-aminophenylthio)-1,4 benzene In the practice of this invention, the gel catalyst and the novel blowing catalyst combination may be present in ratio of 0.01 to 5 parts, say 1 part of the former per part of the latter. In one preferred embodiment, when the blowing catalyst or combination of this invention is used with stannous 2-ethylhexoate as the gel catalyst, the ratio will be approximately 1.

Preferably the catalyst or mixture of catalysts will be present in catalytic amount corresponding to 0.01 to 5, say 0.6 parts by weight per 100 parts of polyol. Preferably, the blowing catalyst will be present in a catalytic amount corresponding to 0.005 to 4.95, say 0.3 parts by weight per 100 parts of polyol, and the gel catalyst will be present in catalytic amount corresponding to 0.005 to 4.2 parts, say 0.6 parts by weight per 100 parts of polyol.

It is also a feature of this invention that the combination herein noted may be used in connection with a wide variety of auxiliary blowing or auxiliary foaming catalysts. These may include tertiary amines, metal soaps wherein the metal may be antimony, bismuth, arsenic, manganese, iron, cobalt, nickel, alkali metal (including ammonium), alakaline earth metal, silver, zinc, cadmium, aluminum, or lead, or organotin compounds having the formula $R'_3SnX'$ wherein R' is hydrocarbon and X' is selected from the group consisting of the negative residual portion of an organic carboxylic acid, a mercaptan, an alcohol, a phenol, and a halogen acid.

Typical tertiary amines which may be employed as auxiliary blowing catalysts include N-alkyl morpholines, e.g. N-methyl morpholine, N-ethyl morpholine (NEM) and cyclic triethylene diamine including, e.g. that which is sold under the trademark DABCO. Particularly preferred tertiary amine auxiliary blowing catalysts may contain N-ethyl morpholine or cyclic triethylene diamine or mixtures thereof, the mixtures containing say about 1–2 parts by weight of cyclic triethylene diamine per 3 parts of N-ethyl morpholine. Tertiary amine blowing catalysts may be particularly desirable when fast rise times are desired.

Typical metal soaps which may be employed as auxiliary blowing catalysts include compounds having the formula $M(OOCR'')_n$ wherein M is selected from the group consisting of antimony, bismuth, arsenic, manganese, iron, cobalt, nickel, silver, zinc, cadmium, aluminum, and lead, R'' is a hydrocarbon group and n is a small whole integer corresponding to the valence of M, typically 1, 2, 3, etc. Preferably n is 1 and the acid from which the soap is derived is monobasic. Among the hydrocarbon groups which may be represented by R'', the following may be particularly noted: aliphatic or cycloaliphatic groups such as alkyl, alkenyl, etc. and corresponding cyclic groups such as cycloalkyl, etc.; an aryl group such as phenyl, substituted phenyls, naphthyl, etc.; an aralkyl group such as benzyl, styryl, cinnamyl, etc.; an alkaryl group such as tolyl, xylyl, etc.; a cycloaliphatic group such as naphthenic group; etc. Other equivalent groups may be employed. In a referred embodiment, R'' may be an alkyl group having less than about 21 carbon atoms. Typical of the acids from which the soaps may be prepared may be acetic acid, propionic acid, butyric acid, caproic acid, caprylic acid, capric acid, stearic acid, oleic acid, etc. Naphthenic acid may be employed. The commercially-occurring mixture of acids known as "tall oil fatty acids" may be employed. When the metal M is antimony, bismuth or arsenic, the preferred R'' group may be an aliphatic group having 6–21 carbon atoms. Typical preferred acids from which these particular soaps may be prepared include 2-ethyl hexoic acid, pelargonic acid, oleic acid, tetrachlorobenzoic acid, cyclohexyl carboxylic acid, and commercially-occurring mixture of tall oil fatty acids.

Specific metal soaps include: antimony tri-2-ethyl hexoate; antimony tripelargonate; arsenic trioleate; antimony tritallate; bismuth tri-2-ethylhexoate; arsenic tripelargonate; antimony tri(tetrachlorobenzoate); antimony tri(cyclohexylcarboxylate); bismuth trioleate; ferric stearate; manganous stearate; cobaltous stearate; cobaltous naphthenate; ferric linoleate; manganous linoleate; ferrous stearate; nickel stearate; calcium naphthenate; ammonium stearate; dimethylammonium stearate; trimethylammonium stearate; calcium stearate; magnesium stearate; barium stearate; lithium stearate; sodium stearate; strontium stearate; potassium oleate; ammonium tallate; strontium-2-ethylhexoate; lead naphthenate; zinc naphthenate; aluminum monostearate; aluminum distearate; aluminum tristearate; plumbous stearate; plumbous stearate (basic); zinc stearate; cadmium stearate; silver stearate; silver acetate; lead pelargonate. Preferred metal soaps include: antimony tritallate; manganese linoleate; ferrous stearate; nickel stearate; calcium naphthenate; barium stearate; sodium stearate; calcium stearate; zinc naphthenate; plumbous stearate; and aluminum distearate. Mot highly preferred metal soaps include: manganese linoleate; calcium naphthenate; cadmium stearate; and particularly antimony tritallate.

In the practice of this invention, according to certain of its aspects, when a blowing catalyst is employed, the curing catalysts may be present in a ratio of 0.1–5 parts by weight to 1 part by weight of blowing catalysts, preferably 0.5–2.5 to 1.

Preferably the catalyst mixture will be present in catalytic amount corresponding to 0.01 to 5, say 0.6 parts by weight per 100 parts of polyol. Preferably, the blowing catalyst will be present in a catalytic amount corresponding to 0.005 to 4.95, say 0.3 parts by weight per 100 parts of polyol, and the gel catalyst will be present in a catalytic amount corresponding to 0.005 to 4.2 parts, say 0.6 parts by weight per 100 parts of polyol.

A variety of organic polyisocyanates may be used in the practice of this invention although diisocyanates are preferred in many formulations. Suitable poly-functional isocyanates include alkylene diisocyanates such as hexamethylene diisocyanates, and decamethylene diisocyanates, tolylene diisocyanates, naphthalene diisocyanates, 4,4'-diphenylmethane diisocyanates, isomers or mixtures of any of these. Triisocyanates typically obtained by reaction with 3 moles of an arylene diisocyanate with 1 mole of a triol, e.g. the reaction products formed from 3 moles of tolylene diisocyanate and 1 mole of hexane triol may be employed. A preferred polyisocyanate is the mixture of 80% 2,4-tolylene diisocyanate and 20% 2,6-tolylene diisocyanate.

The term "isocyanates" is used herein to refer to polyisocyanates and to polyisothiocyanates, respectively, including particularly diisocyanates and diisothiocyanates. While the invention has been described specifically with reference to the reaction of certain diisocyanates, it is generically applicable to the reaction of any compound containing two or more —N=C=G groups in which G is oxygen or sulfur. Compounds within this generic definition include polyisocyanates and polyisothiocyanates of the general formula:
$$R(NCG)_x$$
in which $x$ is two or more and R can be alkylene, substituted alkylene, arylene, substituted arylene, a hydrocarbon or substituted hydrocarbon containing one or more aryl-NCG bonds and one or more alkyl-NCG bonds, a hydrocarbon or substituted hydrocarbon containing a plurality of either aryl-NCG or alkyl-NCG bonds. R can also include radicals such as —R—Z—R where Z may be any divalent moiety such as —O—, —O—R—O—, —CO—, —CO$_2$—, —S—, —S—R—S—, —SO$_2$—, etc. Examples of such compounds include hexamethylene diisocyanate, 1,8-diisocyanato-p-methane, xylylene diisocyanates, (OCNCH$_2$CH$_2$OCH$_2$)$_2$, 1-methyl-2-,4-diisocyanatocyclohexane, phenylene diisocyanates, tolylene diisocyanates, chlorophenylene diisocyanates, diphenylmethane-4,4'-diisocyanates, naphthalene-1, 5-diisocyanate, triphenylmethane-4,4'4''-triisocyanate, xylene-α, α'-diisothiocyanate, and isopropylbenzene-α,4-diisocyanate.

Further included are dimers and trimers of isocyanates and diisocyanates and polymeric diisocyanates of the general formulae:
$$(RNCG)_x \text{ and } [R(NCG)_x]_y$$
in which $x$ and $y$ are two or more, as well as compounds of the general formula:
$$M(NCG)_x$$
in which $x$ is two or more and M is a difunctional or polyfunctional atom or group. Examples of this type include ethylphosphonic diisocyanate, C$_2$H$_5$P(O)(NCO)$_2$; phenylphosphonic diisocyanate, C$_6$H$_5$P(NCO)$_2$; compounds containing a ≡Si—NCG group, isocyanates derived from sulfonamides (RSO$_2$NCO), cyanic acid, and thiocyanic acid.

Substances having two or more active hydrogen atoms determined by the Zerewitinoff method operative in the practice of this invention are those organic compounds having 2 or more reactive hydrogen atoms which react with organic poly-functional isocyanates to give urethane polymers. These polyalkylene polyols, typically exhibiting an average molecular weight of at least about 500, include polyesters, polyethers, polyisocyanate modified polyesters, amides, alkylene glycols, polymercaptans, polyamines, polyisocyanate modified alkylene glycols, etc. These polyalkylene polyols may exhibit active primary or secondary hydroxyl groups. The polyalkylene polyol hydroxy-containing polyethers or polyesters include fatty acid glycerides. Polyersters which are a preferred type of polyalkylene polyol may be obtained by the esterification condensation reaction of aliphatic dibasic carboxylic acid with a glycol or a triol, or mixtures thereof, in proportions such that the resultant polyesters may contain predominately terminal hydroxyl groups. The dibasic carboxylic acids suitable for preparing polyesters include aliphatic and aromatic acids such as adipic acid, fumaric acid, sebasic acid, phthalic acid, etc. Suitable alcohols include ethylene glycols, diethylene glycols, trimethylol propane, etc. The fatty acid glycerides include those having a hydroxyl number of at least 50, such as castor oil, hydrogenated castor oil or blown natural oils.

Polyethers, a preferred type of polyalkylene polyol, include polyalkylene glycols, e.g. polyethylene glycols and polypropolyne glycols, preferably having a molecular weight of at least 200.

The method of this invention is particularly suitable for the reaction of organic polyisocyanates with high molecular weight polymers having at least two end groups containing reactive hydrogen. Preferred class of such polymers includes polyoxyalkylene polyols. These are long chain polyols containing one or more chains of connected oxyalkylene groups. Most desirable, these polyoxyalkylene polyols are liquid having an average molecular weight in the range of 500 to 5,000.

Examples of these polyoxyalkylene polyols include polypropylene glycols having average molecular weights of 500 to 5,000 and reaction products of propylene oxide with linear diols and higher polyols, said higher polyols when employed as reactants giving rise to branched polyoxyalkylene polyols; and ethylene oxide, propylene oxide copolymers having average molecular weights of 500 to 5,000 in which the weight ratio of ethylene oxide to propylene oxide ranges between 10:90 and 90:10, including reaction products mixtures of ethylene oxide and propylene oxide in the said ratios with linear diols and higher polyols.

Examples of linear diols referred to as reactants with one or more alkylene oxides include ethylene glycol, propylene glycol, 2-ethylhexanediol-1,3 and examples of higher polyols including glycerol, trimethylol propane, 1,2,6-hexane triol, pentaerythritol and sorbitol.

Another class of polymers having terminal groups that contain reactive hydrogen atoms suitable for reaction with polyisocyanates are lactone polymers, preferably those exhibiting molecular weights within the range of 500 to 10,000.

The preparation of polyether based urethane foams can be carried out by forming a prepolymer, i.e. pre-reacting molar equivalents of the polyether and isocyanate in the absence of water and thereafter producing a foam by the addition of excess isocyanate, water, and the novel catalyst of this invention. The production of urethane foams may be carried out by the one shot method in which the polyether, novel blowing agent, and isocyanate reactants are simultaneously mixed together and allowed to react in the presence of water. Urethane foams may also be produced by the semi-prepolymer technique in which the polyether reactant is partially extended with excess isocyanate to provide a reaction product containing a high percentage of free isocyanate groups (20–35%) which is then formed in a later stage by reaction with the additional polyether and the novel blowing catalyst of this invention.

Formation of the preferred foamed products of this invention in a one shot system is effected by reacting the polyol with excess poly-functional isocyanate in the presence of water and the novel blowing catalyst of this invention.

Cell modifying agents, e.g. silicones such as trimethyl end-blocked dimethyl polysiloxanes may also be used in the practice of this invention.

The poly-functional isocyanate is typically present in an amount of 5 to 300%, e.g. 40% by weight of the polyol. Water should be present in an amount sufficient to react with the isocyanate to liberate sufficient gas to produce a foam of the desired physical characteristics. Approximately 1 to 10% water, based upon the weight of the polyols, is operable. The mixing of the constituents may be carried out at elevated temperatures or at room temperatures.

In a typical 2-step operation the polyols may be reacted with excess poly-functional isocyanate in the absence of water initially. Subsequently, water and other agents are added to the mixture, i.e. it is possible to prepare a prepolymer by the reaction of the organic polyisocyanate and the organic compound containing at least two active hydrogen-containing groups in a first step and then reacting the resulting isocyanate determined prepolymer with water in the second step in the presence of the novel foaming catalyst of this invention to prepare a cellular polyurethane plastic.

The amount of isocyanate used in the preparation of flexible foams should be such that there is more than the theoretical amount required to form a urethane linkage, $-NCHO-O-$, in the polymer resulting from reaction with the isocyanate with the active hydrogens of the polyether. The amount of isocyanate employed generally ranges from 1 to 7 equivalents preferably 2 to 6 equivalents, per equivalent of polyether.

The reaction of excess diisocyanate with a polyoxypropylene glycol produces a polymer having terminal isocyanate groups. When it is desired to form a foam, the mixture of the isocyanate-modified polyether reacts through the isocyanate groups with a chain-extending agent containing active hydrogen such as water. This involves several reactions that proceed simultaneously including the reaction between the isocyanate groups and water to form urylene links ($-NHCONH-$) and carbon dioxide, as well as the reaction of the urylene links so formed with unreacted isocyanate groups to form biuret cross links. Depending upon the desired density of the urethane foam and the amount of cross linking desired, the total isocyanate equivalent to the active hydrogen equivalent should be such as to provide a ratio of 0.8 to 1.2 equivalents of isocyanate per equivalent of active hydrogen, and preferably a ratio of about 0.9 to 1.1 equivalents.

It is a feature of this invention that the blowing catalyst herein noted may be used in connection with a wide variety of gel catalysts including for example stannous 2-ethylhexoate, etc. In practice of the preferred embodiment of this invention, the preferred gelation catalyst which may be employed may be selected from the group consisting of $Sn(OCOR)_2$ and $R'_aSnX_b$. Other equivalent gelation catalysts may be employed. In the stannous compounds, $Sn(OCOR)_2$, R may be a hydrocarbon residue typically alkyl, alkenyl, aryl, aralkyl, alkaryl, cycloalkyl, etc. R may, for example, be methyl, ethyl, propyl, isopropyl, n-butyl, isobutyl, t-butyl, amyl, hexyl, heptyl, octyl, nonyl, decyl, undecyl, oleyl i.e. 7-heptadecenyl, etc., phenyl, o-, m-, or p-tolyl, naphthyl, cyclohexyl, benzyl, etc. The nature of R will, of course, define the group $-OCOR$; when R is methyl, for example, this group may be the acetate group. Preferably, however, the R group will contain at least about 7 carbon atoms and less than about 17 carbon atoms. When R is heptyl, the group $-OCOR$ may be the 2-ethylhexoate group; when R is 7-heptadecenyl, the group $-OCOR$ is the oleate group, etc. The preferred compounds which may be employed is stannous 2-ethylhexoate and stannous oleate.

In the organotin compounds $R'_aSnX_b$, R' may be the same as R. Preferably R' will be a hydrocarbon residue, typically alkyl, alkenyl, aryl, alkaryl, aralkyl, cycloalkyl, etc. R' may be, for example, methyl, ethyl, propyl, isopropyl, n-butyl, isobutyl, t-butyl, amyl, hexyl, heptyl, octyl, nonyl, decyl, undecyl, oleyl, i.e. 7-heptadecenyl, etc., phenyl, o-, m-, or p-tolyl, naphthyl, cyclohexyl, benzyl, etc. The sum of $a$ and $b$ will be 4, and either of $a$ and $b$ may be 1, 2, and 3. The preferred R' group is the n-butyl group $C_4H_9-$.

In the organotin compounds $R'_aSnX_b$, X may be selected from the group consisting of chlorides and the negative residual portions of organic carboxylic acids $RCOO-$, mercaptides $RS-$, alcohols $RO-$, esters of mercaptoacids $ROOC(CH_2)_nS$ wherein R may be hydrogen or the other residues hereinbefore noted; etc. Typical specific residual portions may include the 2-ethylhexoate, the lauryl mercaptide, the methoxide, and the isooctyl thioglycolate.

The preferred organotin compounds $R'_aSnX_b$ may be those wherein $a$ and $b$ are 2; e.g. dibutyltin dilaurate and dibutyltin di-2-ethylhexoate.

In the practice of this invention, the gel catalyst and the novel blowing catalyst may be present in ratio of 0.01 to 5 parts, say 1 part of the former per part of the latter. In In one preferred embodiment, when the blowing catalyst of this invention is used with stannous 2-ethylexoate as the gel catalyst, the ratio will be approximately 1.

Preferably the catalyst mixture will be present in catalytic amount corresponding to 0.01 to 5, say 0.6 parts by weight per 100 parts of polyol. Preferably, the blowing catalyst will be present in a catalytic amount corresponding to 0.005 to 4.95, say 0.3 parts by weight per 100 parts of polyol, and the gel catalyst will be present in catalytic amount corresponding to 0.005 to 4.2 parts, say 0.3 parts by weight per 100 parts of polyol.

Practice of this invention according to its specific embodiments may be observed by forming a typical one-shot polyether flexible foam by mixing (a) 200 grams of polyalkylene polyol (the polyether triol formed as the condensation product between glycerine and propylene oxide, having a molecular weight of about 3,000, a hydroxyl number of about 56, and sold either under the trademark Niax Triol LG-56 by Union Carbide Chemical Co., or GP-3030 by Wyandotte Chemical Co.); (b) 3.0 grams of cell modifying agent, silicone (Union Carbide Chemical Co.L-540 or L-550 brand of trimethyl end-blocked dimethyl polysiloxane); (c) 90.0 grams of tolylene diisocyanate (80%:20% ratio of 2,4- and 2,6-isomers); (d) 7.0 grams of demineralized water; (e) 0.3 grams (except as otherwise indicated) of the foaming or blowing catalyst; and (f) 0.6 grams (except as otherwise indicated) of the gel catalyst. Table I infra discloses various specific examples using the combinations of catalysts noted, wherein stannous 2-ethylhexoate is used as gel catalyst admired in 50:50 ratio with dioctylphthalate. Thus, in Example 1 set forth in Table I, the reaction mixture includes polyol silicone, diisocyanate, and water, together with 0.4 grams of stannous 2-ethylhexoate gelation catalyst, and 0.3 grams of the blowing catalyst bis(o-aminophenylthio) methane.

The novel blowing catalyst of Example 1 was prepared by forming a slurry of 169g of sodiumhydroxide dissolved in 246g of water added 273.1g of benzothiazole. The reaction mass was heated to reflux and held at reflux for 2 hours following which it was cooled to 25°C.

To the cold reaction mass was added 92.8g of methylene dichloride and the reaction mass was again heated to reflux. After 3 hours of reflux, the vapor temperature was 100°C. indicating complete consumption of this reactant.

After adding 250 ml of water and cooling, the resulting oil was extracted with benzene. The benzene was dried over magnesium sulfate, filtered and the solvent removed by distillation.

The residue weighed 250.0g for a yield of 95.3%. A portion of the residue was then purified as follows:

A benzene solution of the oil was vigorously agitated in the presence of an excess of aqueous hydrochloric acid. Solids developed immediately. The solids were filtered off and washed with acetone. The solids were then dissolved in hot water, some activated charcoal added and the mass gravity filtered. The water was then cooled and crystals of the purified hydrochloride salt were isolated by filtration.

The salt was then slurred in methylene dichloride and a solution of excess sodium hydroxide dissolved in water was added. After adding a few cc's of acetone, the mass was then agitated until all of the solids dissolved.

Phases were then separated and the organic phase was dried over magnesium sulfate and filtered.

The solvent was removed under reduced pressure to leave an oil which gradually crystallized.

The product had an assay of 94.7% and a melting range of 58°–61°C.

The other compounds were synthesized in a similar manner.

In each of the examples, all of the components of the formulation were vigorously stirred upon mixing. The reaction started substantially immediately as evidenced by foaming. The cellular polyurethane product foamed and gelled promptly. The rise time was noted as the time at which the foam had risen to its maximum height. The exotherm was measured by placing a thermometer in the foam and noting the highest temperature to which it rose. Immediately after the mass had foamed, the surface was scraped with a spatula; this was done at 5-second intervals. The gel time was that time when, after scraping, the material did not flow or knit back together. The gel and rise times obtained by these tests are readily correlatable with those obtained in commercial practice. The results are tabulated in Table I.

EXAMPLE

A flexible polyurethane foam was prepared according to the following composition:

| Component | Parts |
|---|---|
| Polyether* | 100.0 |
| Silicon** | 1.5 |
| Water | 3.5 |
| Foaming catalyst | as indicated |
| Stannous octoate | 0.3 |
| N-ethyl morpholine | 0.3 |
| Tolylene diisocyanate | 45.0 |
| (80%:20% ratio of 2,4 and 2,6 isomers) | |
| Organotin gel catalyst | 0.3 |

*polyether triol of glycerine and propylene oxide, having a molecular weight of about 3000, a hydroxyl number of about 56, and sold under the trademark Niax Triol LG-56.
**trimethylol end-blocked diemthyl polysiloxane sold under the trademark Union Carbide L-540.

In each case, the polyether and polyisocyanate were preheated to 30°C. and all of the components were mixed simultaneously. The mixtures were allowed to react without external heating. Rise time, i.e. the time required for the foam to reach its maximum height, was observed and recorded. Gel time, i.e. the time required for the mixture to become non-flowable, was also noted.

The first catalyst employed for purposes of comparison was triethylene diamine foam catalyst (sold as Dabco 33-LV by Houdry.

TABLE I

| Example No. | Foaming Catalyst | Rise Time (Seconds) |
|---|---|---|
| 1 | Bis(o-aminophenylthio)methane | 118 |
| 2 | Bis(o-aminophenylthio)ethane | 130.0 |
| 3 | Bis(o-aminophenylthio)-1,2 propane | 153.0 |

Stannous 2-ethylhexoate and stannous oleate are typical of the gelling catalysts which may commonly be made by netralizing an aqueous solution of a stannous salt with a soap of the desired acid, RCOOH; typically an aqueous solution of stannous chloride may be reacted with a solution of sodium octoate to give the compound stannous octoate, a typical example of materials commonly compound stannous octoate, a typical example of materials commonly believed to have the formula $Sn(OCOR)_2$.

Similarly, selected reactions were run using other polyols, e.g. specifically a polyester of adipic acid having a hydroxyl number of 52 sold under the trademark Foamrez-50 by Witco Chemical Co. The product foams were comparable to those noted in the above Table I.

Comparative polyurethane foams were prepared using only the N-ethyl morpholine as blowing of foaming catalyst. By the use of the novel catalysts of this invention it is readily possible to vary the gel and foaming times independently, so that the optimum value for each is readily attained. The product foams of this invention may be characterized by outstanding physical properties and hand, a fact which is at least in part due to the excellent balance which may be obtained in the competing gelling and foaming reactions. In addition, because of the surprisingly high efficiency of the diorganotin mixed ester catalysts, the foams may contain lower amounts of catalyst residues. Dry heat stability and aging properties may be superior to prior art foams. Acordingly, the foams of this invention may possess a uniquely wide area of utility.

The foam prepared in accordance with this invention had outstanding physical characteristics, including freedom from splitting and closed cells. Similar results may be obtained when organotin mixed ester catalysts of this invention are employed.

The novel catalytic compositions of this invention which are suitable for use as blowing and gel catalysts in the production of polyurethane foams by the reaction of a substance having active hydrogen atoms as determined by the Zerewitinoff method, e.g. a polyalkylene polyol, water, and an organic polyfunctional isocyanate, may contain a gel catalyst and, as a blowing catalyst, a combination of at least one compound selected from those of the formulae:

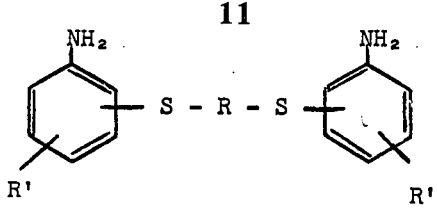

wherein R is a hydrocarbon and R' is selected from the group consisting of hydrogen, halogens, and hydrocarbons. These novel compositions are odor-free, complete catalysts for polyurethane production. The novel polyurethane foams obtained by the process of this invention find a wider variety of uses than polyurethanes heretofore known.

The novel cellular polyurethane compositions prepared in accordance with this invention comprise a cellular polyurethane containing a gelling agent and as a synergistic blowing agent combination 0.004–4.5 parts by weight per 100 parts of polyurethane composition of at least one compound selected from those of the formulae:

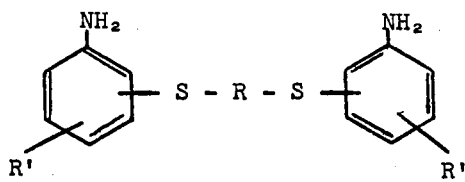

wherein R is a hydrocarbon, and R' is selected from the group consisting of hydrogen, halogens, and hydrocarbons. This novel cellular polyurethane composition may be readily formed into shaped cellular polyurethane objects which may find use in the fabrication of cushions, insulation, and in other areas where cellular polyurethane compositions have heretofore been employed.

Although this invention has been described with reference to specific examples, it will be apparent that various modifications may be made thereto which fall within the scope of this invention.

We claim:

1. The process of making a cellular polyurethane which comprises reacting a polyalkylene polyol having reactive hydrogen atoms as determined by the Zerewitinoff method, an organic poly-functional isocyanate, water, and a gel catalyst, said reaction being carried out in the presence of a gel catalyst and a blowing catalyst comprising at least one compound selected from those of the formulae:

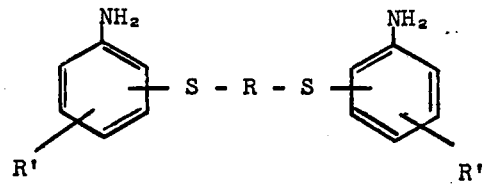

wherein R is a hydrocarbon, and R' is selected from the group consisting of hydrogen, halogens, and hydrocarbons.

2. The process of making a cellular polyurethane as claimed in claim 1 wherein said R' is hydrogen.

3. The process of making a cellular polyurethane as claimed in claim 2 wherein said R is alkyl.

4. The process of making a cellular polyurethane as claimed in claim 1 wherein at least one blowing catalyst is bis(o-aminophenylthio)methane.

5. The process of making a cellular polyurethane as claimed in claim 1 wherein at least one blowing catalyst is bis(o-aminophenylthio)ethane.

6. The process of making a cellular polyurethane as claimed in claim 1 wherein at least one blowing catalyst is bis(o-aminophenylthio)-1,2 propane.

7. The process of making a cellular polyurethane as claimed in claim 1 wherein said blowing catalyst is a combination of at least one tertiary amine and at least one compound selected from those of the formulae:

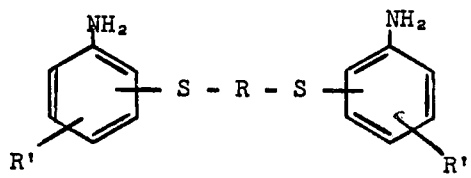

wherein R is a hydrocarbon, and R' is selected from the group consisting of hydrogen, halogens, and hydrocarbons.

8. The process of making a cellular polyurethane as claimed in claim 7 wherein said tertiary amine is N-ethyl morpholine.

9. The process of making a cellular polyurethane as claimed in claim 1 wherein the gel catalyst is a compound selected from the group consising of $Sn(OCOR)_2$ and $R'_a SnX_b$ wherein R and R' are hydrocarbon radicals and X is selected from the group consisting of chloride and negative residual portions of organic carboxylic acids, mercaptides, alcohols, and esters of mercaptoacids, $a$ and $b$ being 1–3, $a$ plus $b$ being 4.

10. The process of claim 1 wherein said catalytic amount is 0.001–5% of the polyol.

11. The process of making a cellular polyurethane which comprises reacting 100 parts of a substance having active hydrogen atoms as determined by the Zerewitinoff method, 5–300 parts of an organic polyfunctional isocyanate, 0.5–10 parts of water, 0.005–4.2 parts of gel catalyst, and as a blowing catalyst combination 0.005 to 4.95 parts of a mixture of at least one tertiary amine and at least one compound exhibiting the formula:

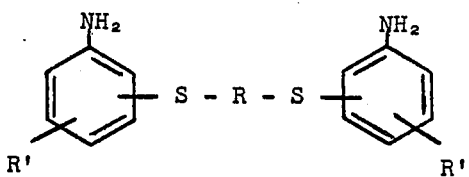

wherein R is a hydrocarbon, and R' is selected from the group consisting of hydrogen, halogens, and hydrocarbons.

12. The process of making a cellular polyurethane which comprises reacting 100 parts of a substance having active hydrogen atoms as determined by the Zerewitinoff method, 5–300 parts of an organic polyfunctional isocyanate, 0.5–10 parts of water, 0.005–4.2 parts of gel catalyst, and as a blowing catalyst combination 0.005 to 4.95 parts of a mixture of a tertiary amine and a compound of the formula:

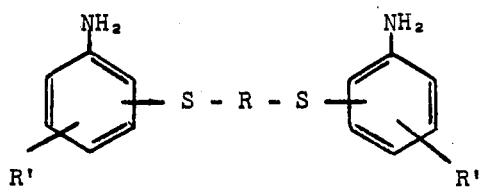

where R is alkyl and R' is hydrogen.

13. The process of making a cellular polyurethane which comprises reacting a substance having active hydrogen atoms as determined by the Zerewitinoff method, an organic poly-functional isocyanate, water, a gel catalyst, and as a blowing catalyst 0.005–4.95 parts of a mixture of 40% of at least one compound exhibiting the formula:

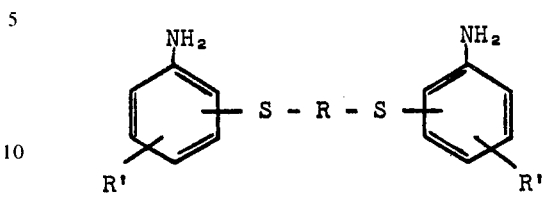

wherein R is a hydrocarbon, and R' is selected from the group consisting of hydrogen, halogens, and hydrocarbons.

* * * * *

Disclaimer 3,933,692.—*Bernard G. Kushlefsky*, Edison, and *Kenneth Treadwell*, Rahway, N.J. URETHANE FOAM CATALYST. Patent dated Jan. 20, 1976. Disclaimer filed Oct. 26, 1976, by the assignee, *M & T Chemicals Inc.*

Hereby enters this disclaimer to claims 1 through 13, all the claims therein, of said patent.

[*Official Gazette August 16, 1977.*]